United States Patent [19]
Takaichi

[11] Patent Number: 5,802,087
[45] Date of Patent: *Sep. 1, 1998

[54] LASER APPARATUS

[75] Inventor: Kohji Takaichi, Chiba-ken, Japan

[73] Assignee: Miyachi Technos Corporation, Noda, Japan

[*] Notice: This patent issued on a continued prosecution application filed under 37 CFR 1.53(d), and is subject to the twenty year patent term provisions of 35 U.S.C. 154(a)(2).

[21] Appl. No.: 584,691

[22] Filed: Jan. 11, 1996

[30] Foreign Application Priority Data

Jan. 11, 1995 [JP] Japan ................. 7-018732

[51] Int. Cl.$^6$ ................................. H01S 3/04
[52] U.S. Cl. ................................. 372/35
[58] Field of Search ................. 372/34, 35, 75, 372/92, 69

[56] References Cited

U.S. PATENT DOCUMENTS

| | | | |
|---|---|---|---|
| 3,500,238 | 3/1970 | Bazinet et al. | 372/35 |
| 3,555,449 | 1/1971 | Osial et al. | 372/35 |
| 3,619,808 | 11/1971 | Tomkins et al. | 372/35 |
| 3,633,126 | 1/1972 | Martin et al. | 372/35 |
| 4,207,541 | 6/1980 | Karger et al. | 372/35 |
| 4,740,983 | 4/1988 | Azad | 372/35 |
| 4,752,937 | 6/1988 | Gorisch et al. | 372/35 |
| 5,012,481 | 4/1991 | Casteleiro | 372/35 |
| 5,130,999 | 7/1992 | Maeda et al. | 372/35 |
| 5,243,615 | 9/1993 | Ortiz et al. | 372/69 |
| 5,253,260 | 10/1993 | Palombo | 372/35 |
| 5,287,371 | 2/1994 | Bournes | 372/35 |
| 5,311,528 | 5/1994 | Fujino | 372/35 |
| 5,422,899 | 6/1995 | Freiburg et al. | 372/35 |
| 5,471,491 | 11/1995 | Phillips et al. | 372/35 |
| 5,572,538 | 11/1996 | Saithoh et al. | 372/35 |
| 5,631,917 | 5/1997 | Ogawa et al. | 372/35 |

Primary Examiner—Rodney B. Bovernick
Assistant Examiner—Robert E. Wise
Attorney, Agent, or Firm—Wenderoth, Lind & Ponack, L.L.P.

[57] ABSTRACT

To prevent a power supply from being covered with dew for circuit protection and to downsize or simplify a laser apparatus: An excitation lamp 10 and a YAG rod (laser medium) 12 of a laser oscillator are disposed within a chamber 14. Heat-generating electrical components or elements of the power supply, such as diodes D1–D6 of a three-phase full-wave rectifier circuit 24, IGBT 26, GTR 30 and output transistors of driver circuits 34 and 36 are mounted on a heat sink 46. A water-cooled cooling apparatus 50 supplies deionized water (cooling water) DW whose temperature is controlled at a predetermined temperature, for instance, 25–35 degrees centigrade to the heat sink 46 of the power supply via pipes 72 and 76 as well as the chamber 14 of the laser oscillator via pipes 70 and 74.

15 Claims, 10 Drawing Sheets

LASER APPARATUS

BACKGROUND OF THE INVENTION

The present invention relates to a water-cooled laser apparatus.

A solid-state laser apparatus such as a YAG laser apparatus basically comprises a laser oscillator, which emits a laser beam, and a power supply for the laser which supplies electric power to the laser oscillator.

In the laser oscillator, an excitation lamp radiates light energy upon a laser medium (e.g. a YAG rod) to generate laser oscillation. For efficient and stable operation of the laser oscillation, the excitation lamp and laser medium of the laser oscillator are typically cooled by cooling water supplied from a water cooler that controls the temperature of the cooling water to a desired temperature.

The power supply comprises a capacitor-charging circuit which rectifies commercial AC electric power into DC electric power and charges a capacitor bank with the DC electric power at a predetermined voltage. A discharging switching element which is disposed between the capacitor bank and the excitation lamp discharges, when turned on, the electric power from the capacitor bank to the excitation lamp. The capacitor-charging circuit includes a rectifier component and a charging switching element. These electrical components or elements produce a large amount of heat. Also, the discharging switching element generates a large amount of heat. Therefore, it is necessary to cool the power supply.

To this end, the conventional laser apparatus employs a fan which supplies a current of air to the power supply for air cooling the power supply. This air-cooled system, however, disadvantageously results in a large-sized laser apparatus since a radiator as well as a large fan is required for a high-power laser apparatus. A recent laser apparatus employs a water-cooled system which supplies commercial water to a cooling plate on which electrical components of the power supply (in particular those components that generate a large amount of heat) are mounted to thereby cool the electrical components.

With the prior art laser apparatus employing the water-cooled system that cools the power supply with commercial water, a considerable difference between the ambient temperature and the temperature of the commercial water causes the power supply to be covered with dew, which may lead to failure of electrical components or circuits. Particularly in the winter, where the air in factory, i.e. the air around the laser apparatus, is warmed by a heating system, very cold commercial water is supplied to the power supply, so that it may be wet with dew and thus subject to shortcircuits or ground faults.

SUMMARY OF THE INVENTION

With the above-mentioned problems in mind, an object of the invention is to provide a laser apparatus which prevents dewing of the power supply to thereby protect electrical components or circuits thereof and has the advantage of downsizing and simplifying the apparatus.

In accordance with an aspect of the invention, there is provided a laser apparatus which comprises a laser oscillator for emitting a laser beam, a power supply means for supplying electric power to the laser oscillator and a cooling water supply for supplying common and temperature-controlled cooling water to the laser oscillator and the power supply.

In one embodiment, the cooling water supply comprises a heat exchanger for providing heat exchange between primary and secondary cooling water to thereby control the temperature of the secondary cooling water to a predetermined temperature and circulating system including a pump and piping for circulating the secondary cooling water between a secondary port of the heat exchanger and the laser oscillator and between the secondary port of the heat exchanger and the power supply.

In another embodiment, the power supply comprises a heat-conductive heat sink on which heat-generating electrical components are disposed and a waterway conduit disposed in the heat sink through which the cooling water flows.

In accordance with the invention, the cooling water supply supplies temperature-controlled cooling water in common to both the laser oscillator and the power supply. The power supply cannot be covered with dew since the temperature thereof is stabilized to a small difference with the ambient temperature. Thus, shortcircuits or ground faults of the electrical components or circuits of the power supply are avoided. Since the laser oscillator and the power supply share a common cooling water supply, the piping and/or pipefitting may be simplified to thereby contribute to downsizing and reducing the cost of the apparatus.

BRIEF DESCRIPTION OF THE DRAWINGS

The above and other objects and advantages of the invention will become more apparent from the following description when taken in conjunction with the drawings, in which.

DETAILED DESCRIPTION OF THE PREFERRED EMBODIMENTS

Figure 1:
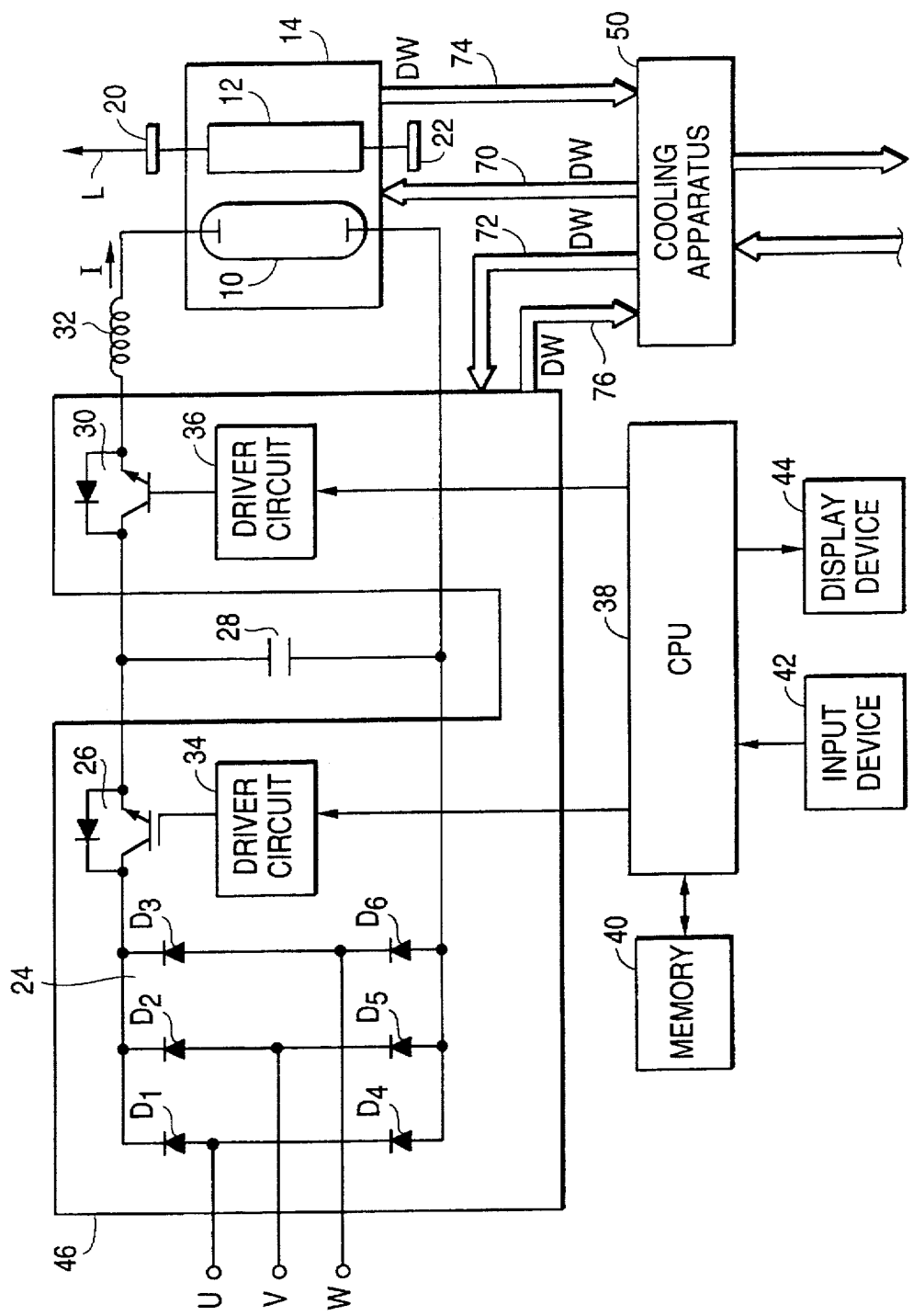
FIG. 1 is a block diagram of one embodiment of a YAG laser beam processing apparatus in accordance with the invention.

FIG. 1 shows one embodiment of a YAG laser beam processing apparatus in accordance with the invention.

In the YAG laser beam processing apparatus, an excitation lamp 10 and an YAG rod (laser medium) 12 of a laser oscillator are disposed within a reflector cylinder (not shown) within a chamber 14 made of resin, such as acrylic resin. A pair of optical resonator mirrors 20 and 22 are disposed outside of the chamber 14 in the optical axis of the YAG rod 12 and face each other through the rod 12.

The excitation lamp 10 emits light in pulses in response to lamp current I supplied from a power supply (to be described). The light energy from the lamp 10 excites the YAG rod 12 to emit light from both its end faces. The light from the rod 12 repeats reflections between the optical resonator mirrors 20 and 22 and is thus amplified. The amplified light (pulsed laser beam) L outputs from an output mirror 20. The pulsed laser beam L from the output mirror 20 enters an optical fiber (not shown) through a laser beam input unit (not shown). After passing through the optical fiber, the pulsed laser beam L is received by a focusing unit (not shown) which directs the pulsed laser beam L to a point of a workpiece to be processed.

In the power supply, three-phase input terminals U, V and W receive three-phase AC commercial electric power. A three-phase full-wave rectifier 24 including six diodes D1–D6 converts the three-phase AC electric power to DC electric power. The DC electric power is supplied to a capacitor bank 28 through a charge controlling insulated gate bipolar transistor (IGBT) 26. One end of the capacitor bank 28 is connected to one end of the excitation lamp 10 through a discharge controlling giant transistor (GTR) 30 and a current smoothing coil 32. The other end of the capacitor bank 28 is connected to the other end of the excitation lamp 10. When GTR 30 turns on, the electric power (electric energy) stored (charged) in the capacitor bank 28 is supplied to the excitation lamp 10 through the GTR 30 and the coil 32.

The switching of the charge controlling IGBT 26 and the discharge controlling GTR 30 is controlled by CPU 38 through driver circuits 34 and 36, respectively.

CPU 38 controls the entirety of the YAG laser beam processing apparatus. CPU 38 is connected to a memory 40, an input device 42, a display device 44, etc. The memory 40 stores programs, input data, computed data, etc. according to which CPU 38 operates. The input device 42 may comprise a keyboard and is used to input data. The display device 44 displays input data from the input device 42, alarm and messages from CPU 38.

There may be provided sensors and measuring circuits (not shown) that detect electrical parameters of the power supply such as charged voltage across the capacitor bank 28, lamp current I flowing through the excitation lamp 10, voltage across the excitation lamp 10, electric power supplied to the excitation lamp 10, etc. The display device 44 may display such measured results. CPU 38 may control switching of ICBT 26 and GTR 30 based on the measured results.

In the present YAG laser beam processing apparatus, those electrical components or elements of the power supply which produce a relatively large amount of heat, for instance, the diodes D1–D6 of the three-phase full-wave rectifier circuit 24, IGBT 26, GTR 30, and the output transistors of the driver circuits 34 and 36 are disposed on a heat sink 46 (to be described). The present YAG laser beam processing apparatus further comprises a water-cooled cooling apparatus 50 which supplies deionized water (cooling water) DW with its temperature controlled at a predetermined temperature, for instance 25 to 35 degrees centigrade to the chamber 14 of the laser oscillator via piping 70 and 74 and also supplies the same water to the heat sink 46 of the power supply via piping 72 and 76.

Figure 2:
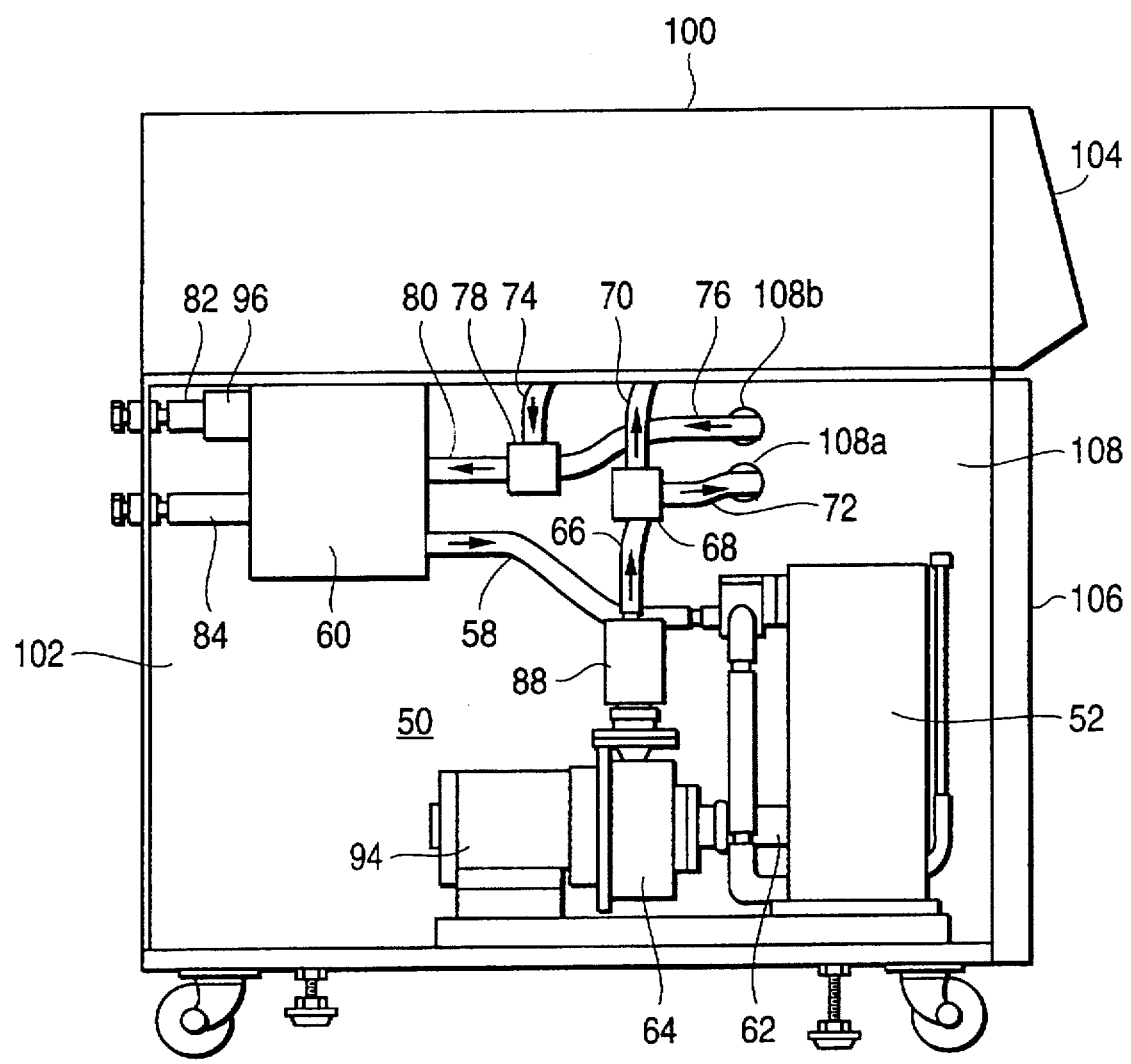
FIG. 2 is a simplified side view of a cooling apparatus in accordance with the invention.
Figure 3:
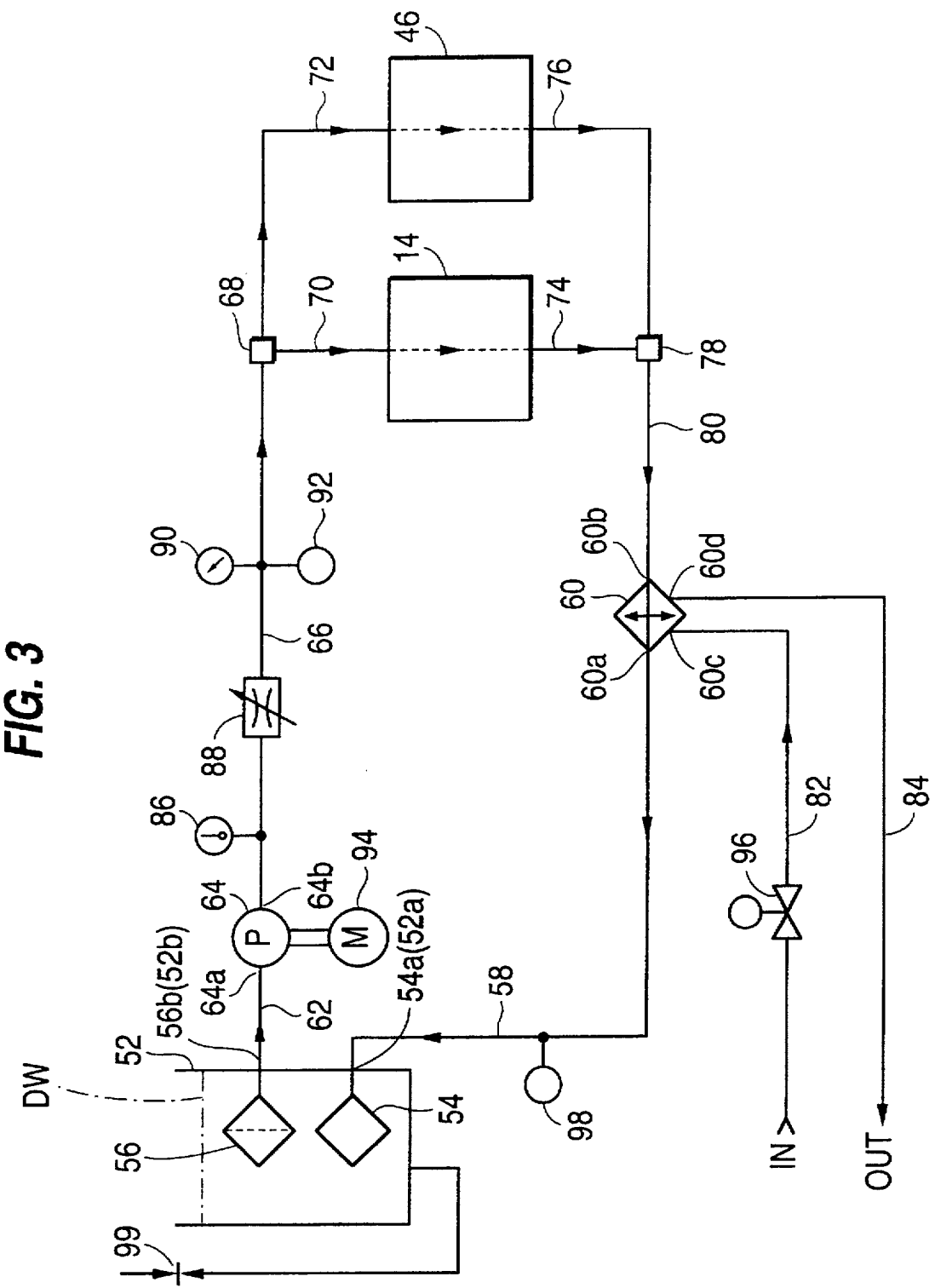
FIG. 3 is a fluid circuit diagram of the cooling apparatus in accordance with the invention.

FIG. 2 is a simplified side view of the cooling apparatus 50 in the present YAG laser beam processing apparatus. FIG. 3 is a diagram of a fluid circuit representation of the cooling apparatus 50.

As shown in FIG. 2, the present YAG laser apparatus comprises an upper unit 100 and a lower unit 102 integral therewith. The laser oscillator and laser control circuit boards etc. are disposed within the upper unit 100. A display panel and lamps of the display device 44, and key switches of the input device 42 are disposed on a front panel 104 of the upper unit 100. A door 106 is disposed at the front of the lower unit 102. The interior of the lower unit 102 is subdivided by a vertical partition wall 108 into left and right sides as seen from the front thereof. The cooling apparatus 50 is disposed on the left side (at the front of the vertical partition wall 108 seen in FIG. 2) whereas the power supply is disposed on the right side (at the back of the vertical partition wall 108 seen in FIG. 2).

In FIGS. 2 and 3, a storage tank 52 holds deionized water DW as cooling water. An ion exchanger 54 and a filter 56 are disposed underwater within the tank 52. An inlet 54a of the ion exchanger 54, i.e. an inlet 52a of the tank 52, communicates with a secondary outlet 60a of a heat exchanger 60 via piping 58. An outlet 56b of the filter 56, i.e. an outlet 52b of the tank 52, communicates with an inlet 64a of a pump 64 via piping 62.

The deionized water DW from an outlet 64b of the pump 64 has a temperature of, say, 30 degrees centigrade. This water is not only supplied to the chamber 14 of the laser oscillator via piping 66, connector 68 and piping 70, but also supplied to the heat sink 46 of the power supply via piping 66, connector 68 and piping 72.

Within the chamber 14, the deionized water DW flows through glass tubes containing the YAG rod 12 and the excitation lamp 10, respectively, and through a conduit disposed in the oscillator block, as will be described. In the heat sink 46, the deionized water DW flows through pipes disposed in the heat sink 46, as will be described.

The temperature of the deionized water DW flowing out of the chamber 14 has risen by about a few degrees centigrade, and this water is supplied to a secondary inlet 60b of the heat exchanger 60 via piping 74, connector 78 and piping 80.

The temperature of the deionized water flowing out of the heat sink 46 has risen by, for instance, about 10 degrees centigrade, and this water is supplied to the secondary inlet 60b of the heat exchanger 60 via piping 76, connector 78 and piping 80. Commercial or industrial water (primary cooling water) is supplied to a primary port 60c of the heat exchanger 60 via piping 82 and 84. The deionized water DW flows into the secondary inlet 60b of the heat exchanger 60 in which the water undergoes heat exchange with the primary commercial water so that the temperature of the deionized water DW falls to, for instance, about 25 degrees centigrade. The deionized water DW from the secondary outlet 60a is supplied to the inlet 52a of the tank 52, i.e. the inlet 54a of the ion exchanger 54.

The ion exchanger 54 deionizes the water DW. The water DW flows out of the ion exchanger and then passes through the filter 56 within the tank 52. The filter 56 removes (filters) unnecessary materials (e.g., organic materials) from the water DW. Then the deionized water DW is drawn by the pump 64 back to the chamber 14 and the heat sink 46.

A temperature sensor 86, flow regulating valve 88, pressure sensor 90 and conductivity sensor 92 are disposed in the piping 66 downstream of the pump 64 to detect the temperature, pressure, and electric conductivity of the deionized water DW to be supplied to the chamber 14 and heat sink 46. In FIG. 3, a motor 94 drives the pump 64. A solenoid valve 96 controls the commercial water supply to the heat exchanger 60. A flow switch 98 detects the flow of the deionized water DW. A drain 99 is used to discharge the deionized water DW from the tank 52.

The temperature sensor 86, pressure sensor 90, conductivity sensor 92 and flow switch 98 are not shown in FIG. 2. In FIG. 2, openings 108a and 108b are formed in the partition wall 108 to pass the pipes 72 and 76 therethrough which communicates the cooling apparatus 50 with the heat sink 46 of the power supply.

Figure 4:
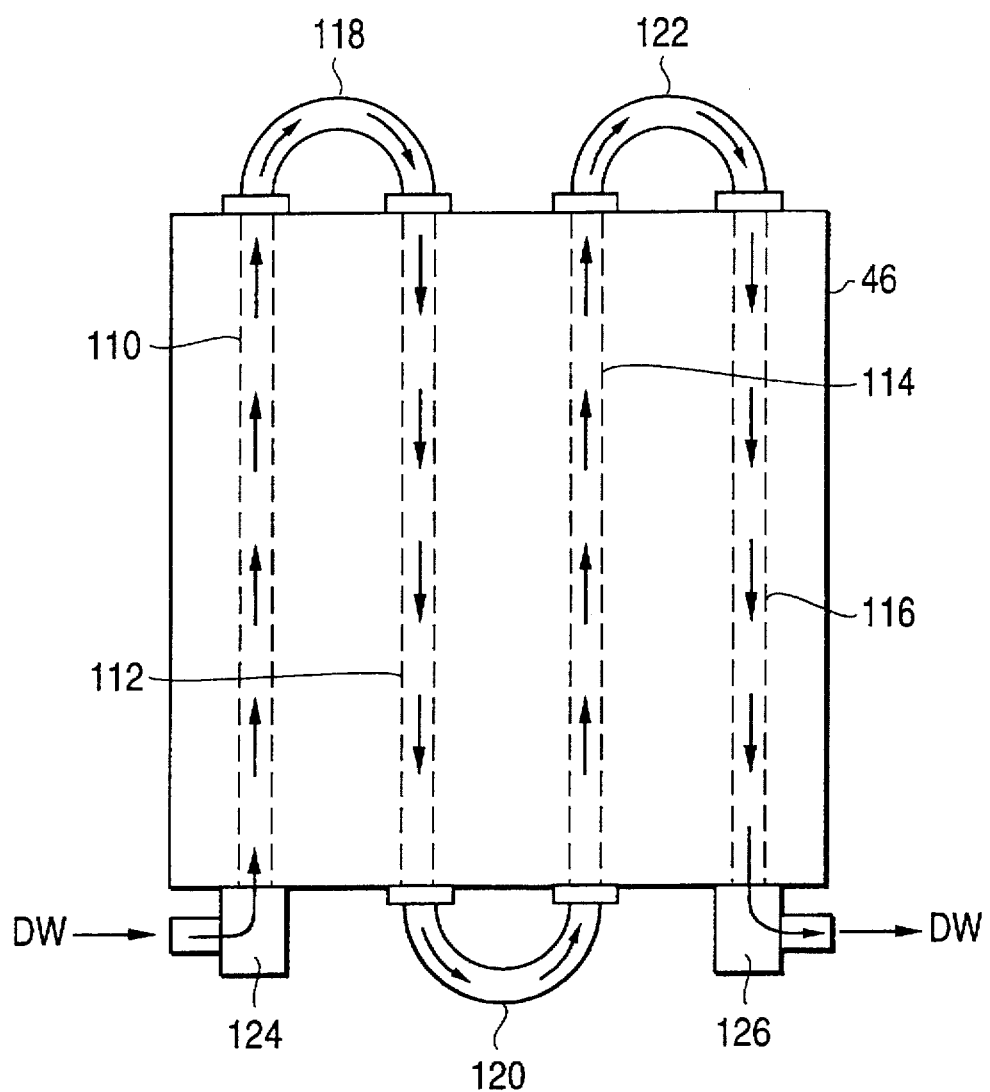
FIG. 4 is a simplified plan view of a heat sink in a power supply showing a cooling water piping construction in accordance with the invention.

FIG. 4 schematically shows the cooling water piping structure in the heat sink 46 of the power supply. Four pipes 110–116 disposed in the heat sink 46 are connected by joints 118, 120 and 122 disposed externally of the heat sink 46 so as to form a continuous cooling water passage. Ends of the cooling water passage are connected to the external pipes 72 and 76 (not shown) via connectors 124 and 126.

In accordance with the cooling water piping structure of the heat sink 46, the deionized water (cooling water) DW flows into an inlet of the pipe 110 via the connector 124, passes through the pipe 110, joint 118, pipe 112, joint 120, pipe 114, joint 122 and pipe 116 in this order as indicated by arrows, reaches an outlet of the pipe 116, and flows out of the heat sink 46 via the connector 126.

Flow of the deionized water through the pipes 110–116 disposed in the heat sink 46 causes the heat sink 46 and thus, the electrical components disposed thereon to be cooled.

Figure 5:
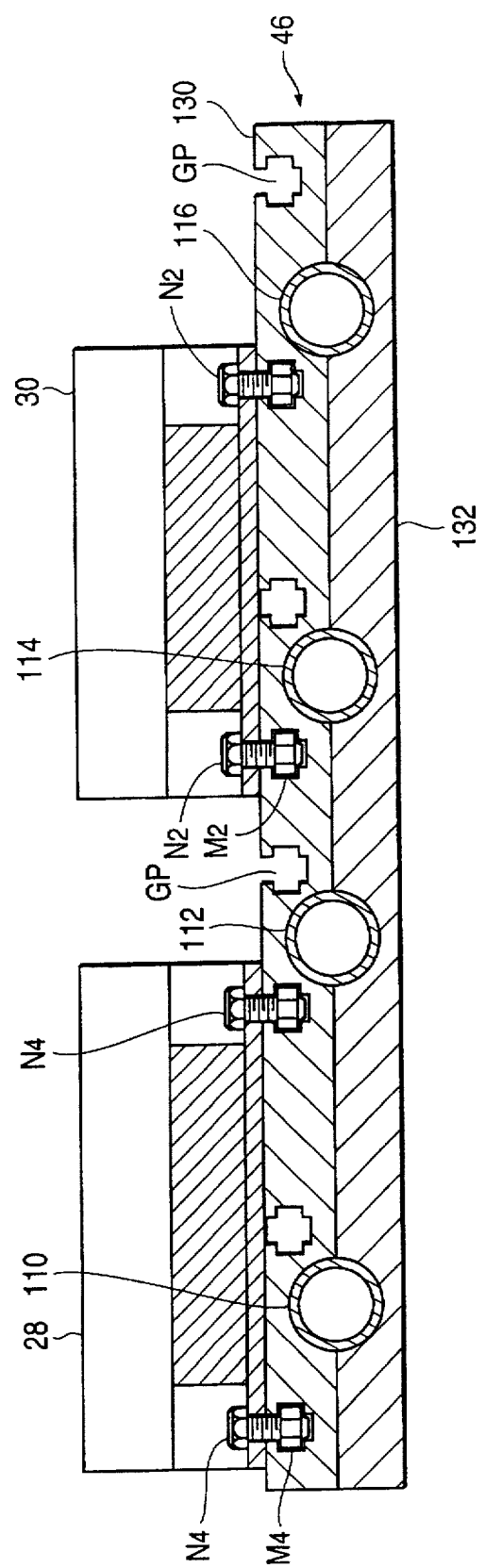
FIG. 5 is a detailed cross sectional view of the heat sink.

FIG. 5 is a detailed cross sectional view of the heat sink 46. The heat sink 46 comprises a heat-conductive upper plate 130 and a heat-conductive lower board 132 with the four pipes 110–116 sandwiched therebetween. Each plate 130, 132 is made from materials (e.g., aluminum, copper) having high thermal conductivity and machinability.

Heat-generating electrical components or elements of the power supply, such as the charging control IGBT 26 and the discharging control GTR 30, etc., are mounted on a surface (top surface) of the upper plate 130. Grooves GP having a reversed T-shaped cross section are formed in the surface (top surface) of the upper plate 130 with a predetermined space therebetween. Bolts N1–N4 that fasten GTR1–GTR4 are engaged with nuts M1–M4 within the grooves GP. The position of GTR$_i$ may be adjusted along the grooves GP by loosening or removing the bolt N$_i$.

Figure 6:
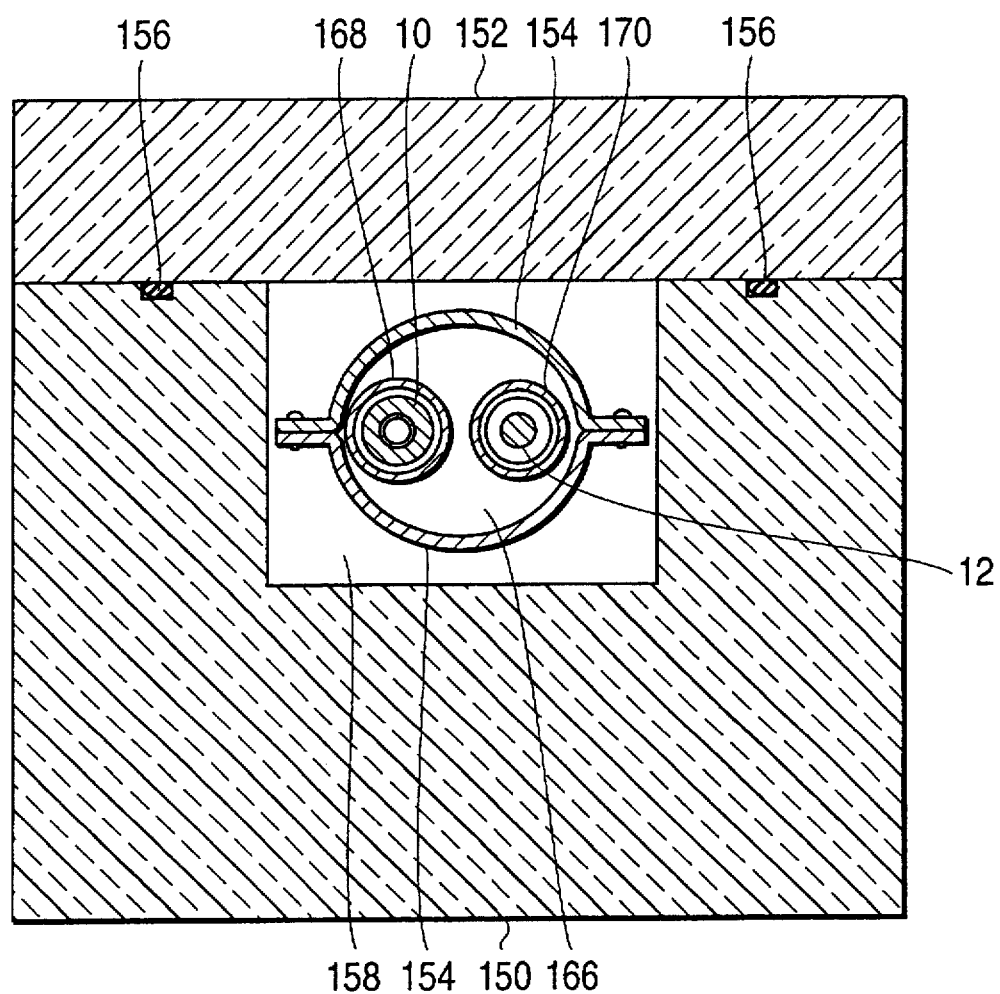
FIG. 6 is a cross sectional view of a laser oscillator in accordance with the invention.
Figure 7:
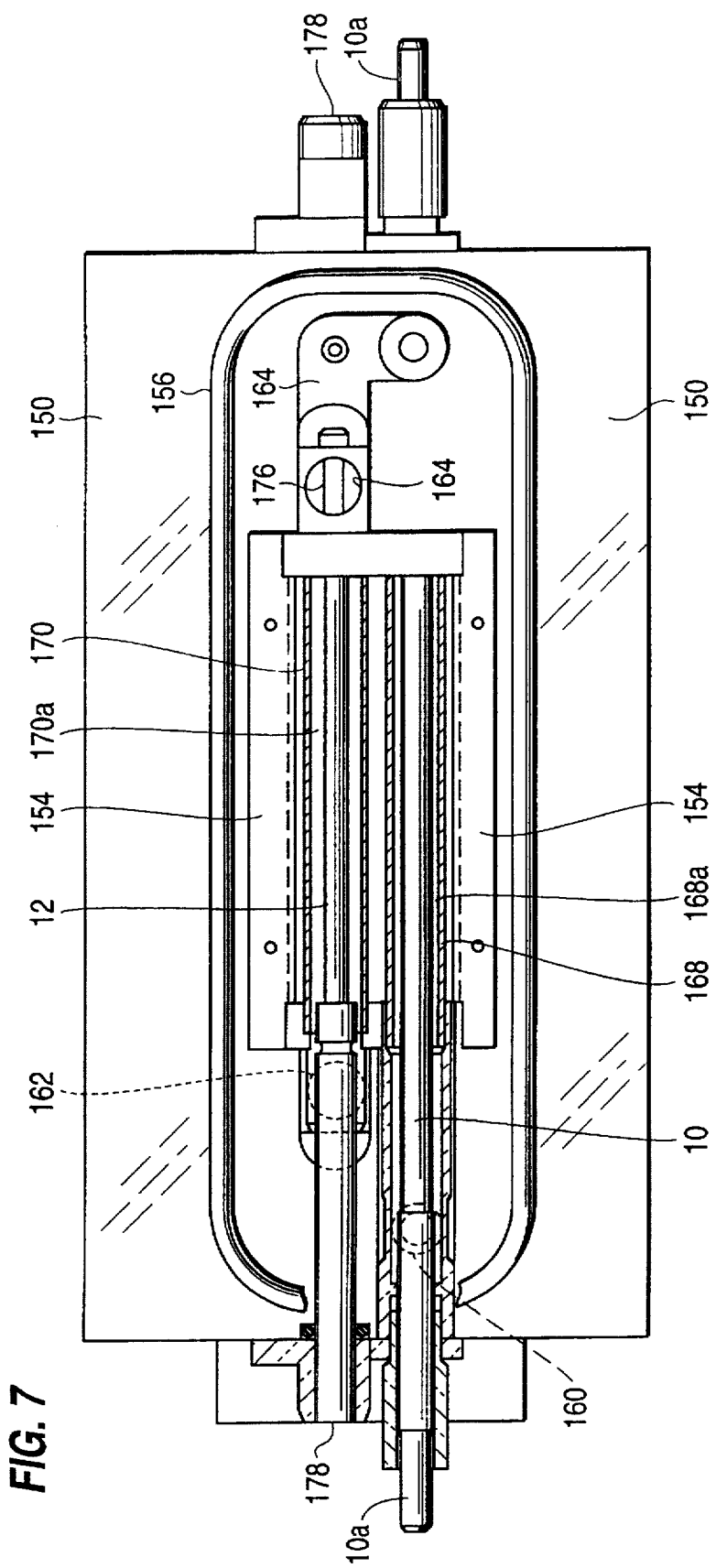
FIG. 7 is a plan view of the laser oscillator in accordance with the invention.
Figure 8:
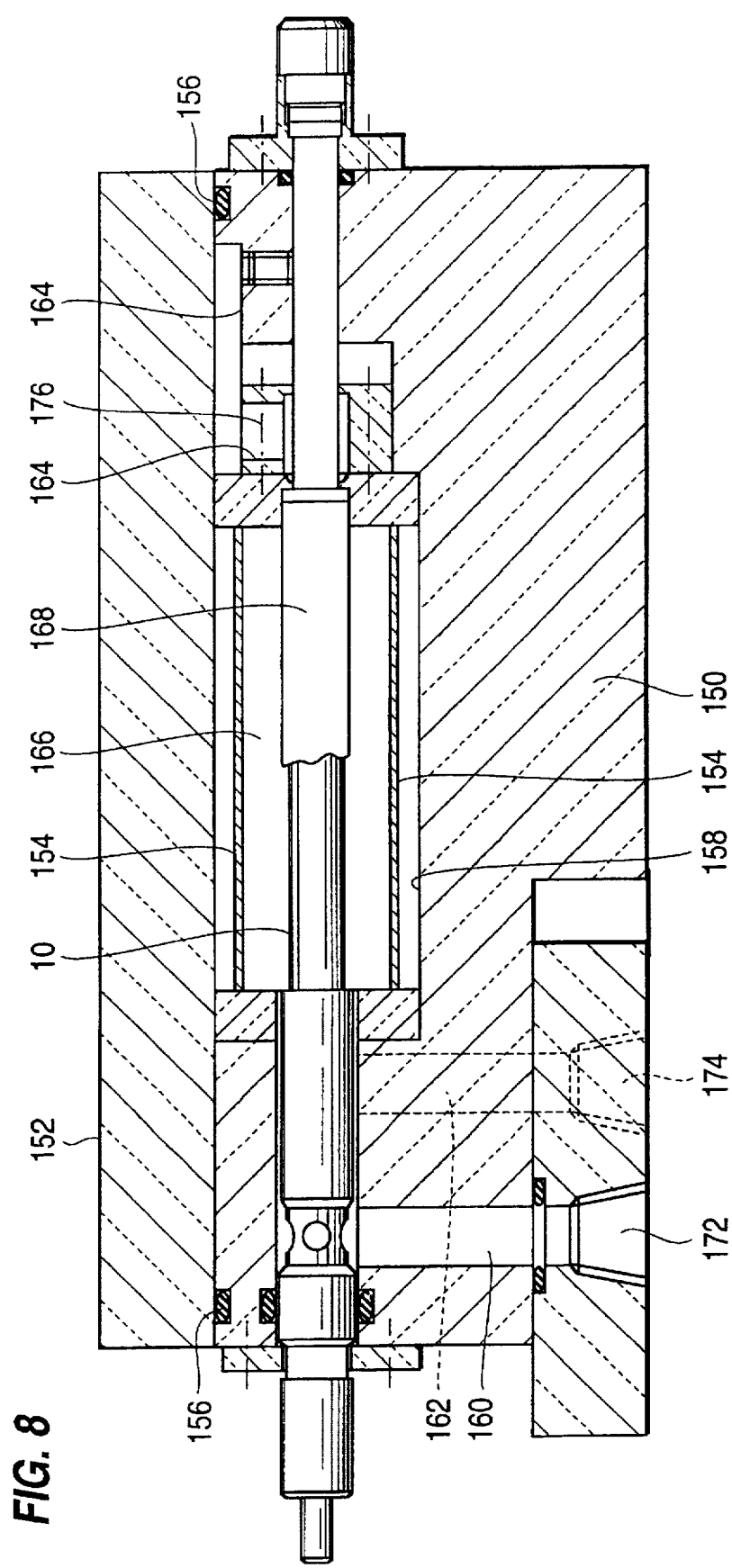
FIG. 8 is a longitudinal sectional view of the laser oscillator in accordance with the invention.

FIGS. 6 to 8 show one embodiment of the laser oscillator. A cross sectional view thereof is shown in FIG. 6, a plan view is shown in FIG. 7 and a longitudinal sectional view is shown in FIG. 8. For simplicity, FIG. 7 shows a laser oscillator structure as it appears when an upper reflector 154 is removed.

The chamber (150, 152) comprises a chamber body 150 of acrylic resin and a chamber cover 152 tightly coupled to the chamber body 150 by means of O-rings 156 and bolts (not shown), etc. A compartment 158 is formed in the center of the chamber and houses the excitation lamp 10 and YAG rod 12. Conduits 160, 162 and 164 that supply the deionized water DW (cooling water) to these components 10 and 12 are formed in the chamber.

In FIG. 6, an elliptical reflector cylinder 166 comprises upper and lower reflectors 154, 154. Within the elliptical reflector cylinder 166, the excitation lamp 10 is disposed at one of the focus points thereof whereas the YAG rod 12 is disposed at the other focus point. Heat-resisting glass tubes 168 and 170 contain the excitation lamp 10 and YAG rod 12, respectively. The deionized water DW flows through the glass tubes.

In FIGS. 7 and 8, a cooling water inlet 172 and a cooling water outlet 174 communicate with the cooling apparatus 50 (not shown) via external pipes 70 and 74 (not shown), respectively. The cooling water inlet 172 communicates with an end of a conduit 170a of the glass tube 170 via the chamber conduit 160. The cooling water outlet 174 communicates with an end of a conduit 168a of the glass tube 168 via the chamber conduit 162.

The other end of the conduit 168a of the glass tube 168 communicates with the other end of a conduit 170a of the glass tube 170 via the chamber conduit 164. Thus the deionized water DW from the cooling apparatus 50 (not shown) flows through the cooling water inlet 172, chamber conduit 160, glass tube conduit 170a, chamber conduit 164, glass tube waterway 168a, chamber conduit 162 and the cooling water outlet 174, in this order. The YAG rod 12 and the excitation lamp 10 disposed in the glass tube conduits 170a and 168a, respectively, are thus directly cooled by the deionized water DW passing therethrough. Reference numerals 176, 178 and 10a denote a bolt for fastening the laser oscillator, a laser beam exit aperture and a lamp terminal, respectively.

The present YAG laser beam processing apparatus is so arranged that the cooling apparatus 50 supplies the same temperature-controlled cooling water (deionized water DW) to the power supply as well as the laser oscillator. With this arrangement, the temperature of the power supply is stabilized with a small difference from the ambient temperature. Thus the power supply will not be covered with dew in any environment, even in winter, so that electrical components or circuits thereof may be protected from failure or damage. Since the commercial water is supplied to the cooling apparatus 50 only, the piping thereof is simplified, contributing to the downsizing of the laser apparatus.

In the above embodiment, connecting ports 83 and 85 of the cooling apparatus 50 to the external (commercial water supply) piping are disposed at the back of the laser apparatus. They may also be disposed at the front of the laser apparatus as shown in FIG. 9.

Figure 9:
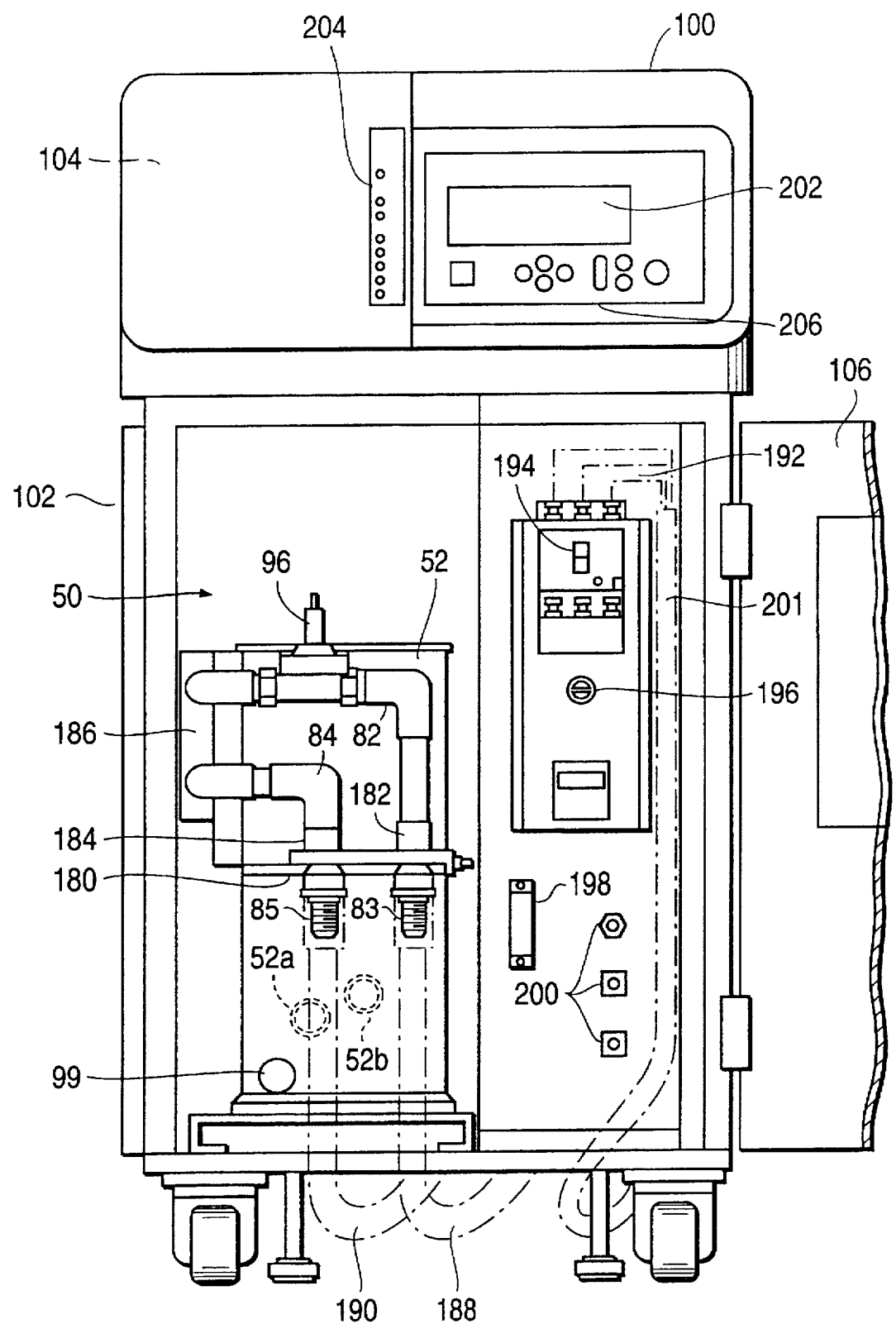
FIG. 9 is a front view of the YAG laser beam processing apparatus in accordance with the invention.

FIG. 9 shows a modified YAG laser processing apparatus as it appears when the front panel (door) 106 is opened with part of the lower unit 102 revealed. Corresponding components in FIG. 9 and those of the above embodiment are designated by like numerals.

In the YAG laser beam processing apparatus of FIG. 9, the interior of the lower unit 102 is subdivided into left and right sides in which the cooling apparatus 50 and the power supply are contained, respectively, as in the above embodiment.

The storage tank 52 of the cooling apparatus 50 stores the deionized water DW to be supplied to the laser oscillator and is disposed at the front of the apparatus. The tank 52 contains the ion exchanger 54 and the filter 56 disposed underwater.

A support board 180 is fixed on the front of the tank 52. Commercial water inlet 182 and outlet 184 (connecting ports to the external piping) are supported by the support board 180. The commercial water inlet 182 and outlet 184 communicate with the primary inlet and outlet of the heat exchanger 60 (not shown) within the cooling apparatus via the pipes 82 and 84, respectively. As shown, the pipes 82 and 84 extend inwardly along the front and side of the tank 52. A support board 186 having openings for admitting the pipes 82 and 84 is fixed on a side of the tank 52. A solenoid valve 96 that controls the commercial water supply to the heat exchanger is disposed midway in the pipe 82.

A drain port 99 for discharging the cooling water from the tank 52 is disposed at the front of the tank 52. When discharging, the drain port 99 is connected to an external pipe. The commercial water inlet 182 communicates with a water faucet (not shown) via an external pipe 188 shown by dashed lines. The commercial water outlet 184 communicates with a drain tank or drain water channel (not shown) via an external pipe 190 indicated by dashed lines.

With the YAG laser processing apparatus of the invention, external pipe connecting ports, such as commercial water inlet 182 and outlet 184, drain port 99 etc., are disposed at the front of the apparatus. Hence maintenance personnel do not have to access the back of the apparatus or to move it, but can simply do the maintenance, such as setting, inspection, repair, from the front thereof.

In the power supply, a forward support plate 192 carries external connecting terminals including an I/O connector 198 and control/external communication connector 200 as well as a circuit breaker 194 and a key switch 196. A power cable 201 shown by dashed lines is connected to a primary terminal of the circuit breaker 194 on the forward support plate 192. Thus in the case of electrically connecting the YAG laser apparatus to an external apparatus or inspecting the circuit breaker, the maintenance personnel do not need to access the back of the apparatus but simply can open the front door 106 to do the wiring.

A liquid crystal display 202 and lamps 204 of the display device 44 and key switches 206 of the input device 42 are disposed on the front panel 104 of the upper unit 100.

In accordance with the laser apparatus of the invention, the same cooling water having a controlled temperature is supplied to both the laser oscillator and the power supply. Thus the power supply is never covered with dew and electrical components or circuits thereof are safely protected. In addition, the sharing of the cooling water supply contributes to the downsizing or simplification of the apparatus.

The invention is not restricted to the embodiments described above. Various modifications can be made within the scope of the invention.

Figure 10:
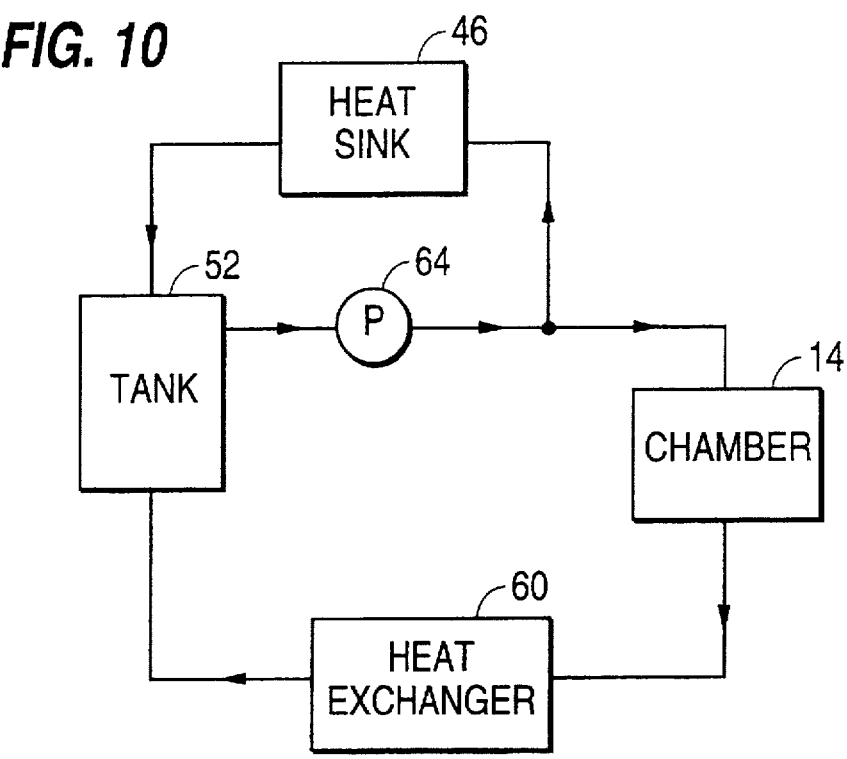
FIG. 10 is a fluid circuit diagram of a modified cooling apparatus in accordance with the invention.
Figure 11:
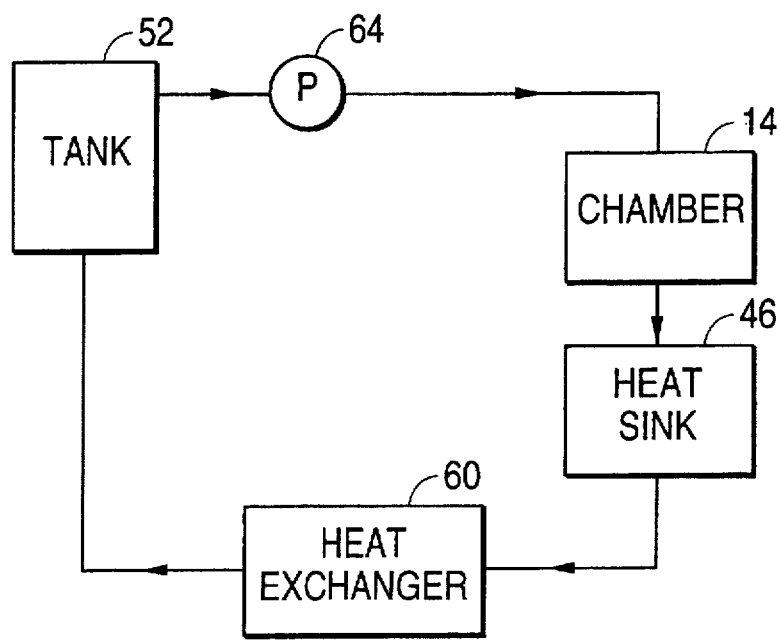
FIG. 11 is a fluid circuit diagram of a further modified cooling apparatus in accordance with the invention.

In the above embodiments the chamber 14 and the heat sink 46 are connected in parallel to the cooling apparatus 50. This is only illustrative and other connections may be employed. For example, the heat sink 46 may be connected between the pump 64 and the tank 52, as shown in FIG. 10. In the alternative, the heat sink 46 may be connected in series with (preferably downstream of) the chamber 14.

The structure of the chamber 14 and the structure of the heat sink 46 in the above embodiments are merely illustrative. Any other suitable structure thereof may be employed.

Whereas the above embodiments are directed to a YAG laser processing apparatus, the invention can be applied to any other laser apparatus. Cooling water is not restricted to deionized water. Any other suitable cooling liquid may be used.

What is claimed is:

1. A laser apparatus comprising:
   a laser oscillator having a first fluid flow passage extending there through;
   an electric power supply electrically connected to said laser oscillator for supplying electric power thereto, said electric power supply comprising a plurality of electrical components;
   a heat-conductive heat sink having at least some of said electrical components of said electric power supply mounted thereon so as to be thermally coupled to said heat sink and having a second fluid flow passage extending there through so as to be electrically isolated from said electrical components; and
   a cooling water supply communicating through piping with said first and second fluid flow passages so as to be capable of supplying common cooling water to both said laser oscillator and said heat sink.

2. The laser apparatus of claim 1, wherein said cooling water supply defines a means for supplying a secondary cooling water to said laser oscillator and said electric power supply as common temperature controlled cooling water, and for controlling the temperature of the secondary cooling water with primary cooling water by exchanging the heat of the secondary cooling water with the primary cooling water.

3. The laser apparatus of claim 1, wherein said cooling water supply comprises a supply tank having an output conduit communicating with said first and second fluid flow passages.

4. The laser apparatus of claim 3, wherein said first and second fluid flow passages communicate in parallel with said output conduit.

5. The laser apparatus of claim 3, wherein said first and second fluid flow passages communicate in series with said output conduit.

6. The laser apparatus of claim 3, wherein said cooling water supply forms part of a cooling water circuit that further includes said first and second fluid flow passages, said supply tank and said output conduit.

7. The laser apparatus of claim 6, wherein said circuit comprises at least one return conduit having a return end communicating with said tank and having another end communicating with at least one of said first and second fluid flow passages.

8. The laser apparatus of claim 7, wherein there is one return conduit, and said another end communicates with both said first and second fluid flow passages.

9. The laser apparatus of claim 7, wherein there are two return conduits comprising two said another ends, each of said another ends communicating with a respective one of said first and second fluid flow passages.

10. The laser apparatus of claim 6, wherein said circuit comprises a pump for pumping cooling water through said circuit and a heat exchanger downstream of at least one of said first and second fluid flow passages for exchanging heat of the cooling water.

11. The laser apparatus of claim 1, wherein said heat exchanger communicates with a return pipe having one end communicating with said heat exchanger and another end communicating with said supply tank.

12. The laser apparatus of claim 1, wherein said heat sink comprises a heat conductive lower board having a plurality of pipes defining said second fluid flow passage sandwiched therebetween, said electrical components being mounted on said heat conducting upper board.

13. The laser apparatus of claim 1, wherein said laser oscillator comprises an excitation lamp and YAG rod, and said first fluid flow passage extends around said excitation lamp and said YAG rod.

14. The laser apparatus of claim 1, wherein each of said excitation lamp and said YAG rod have respective glass tubes therearound defining said first fluid flow passage.

15. The laser apparatus of claim 14, wherein said excitation lamp and said YAG rod are located in a chamber of a chamber body, said chamber body having a cooling water inlet connected with one of said glass tubes and a cooling water outlet connected with the other of said glass tubes, and wherein said respective glass tubes communicate with each other via a chamber conduit.

* * * * *